No. 793,537. Patented June 27, 1905.

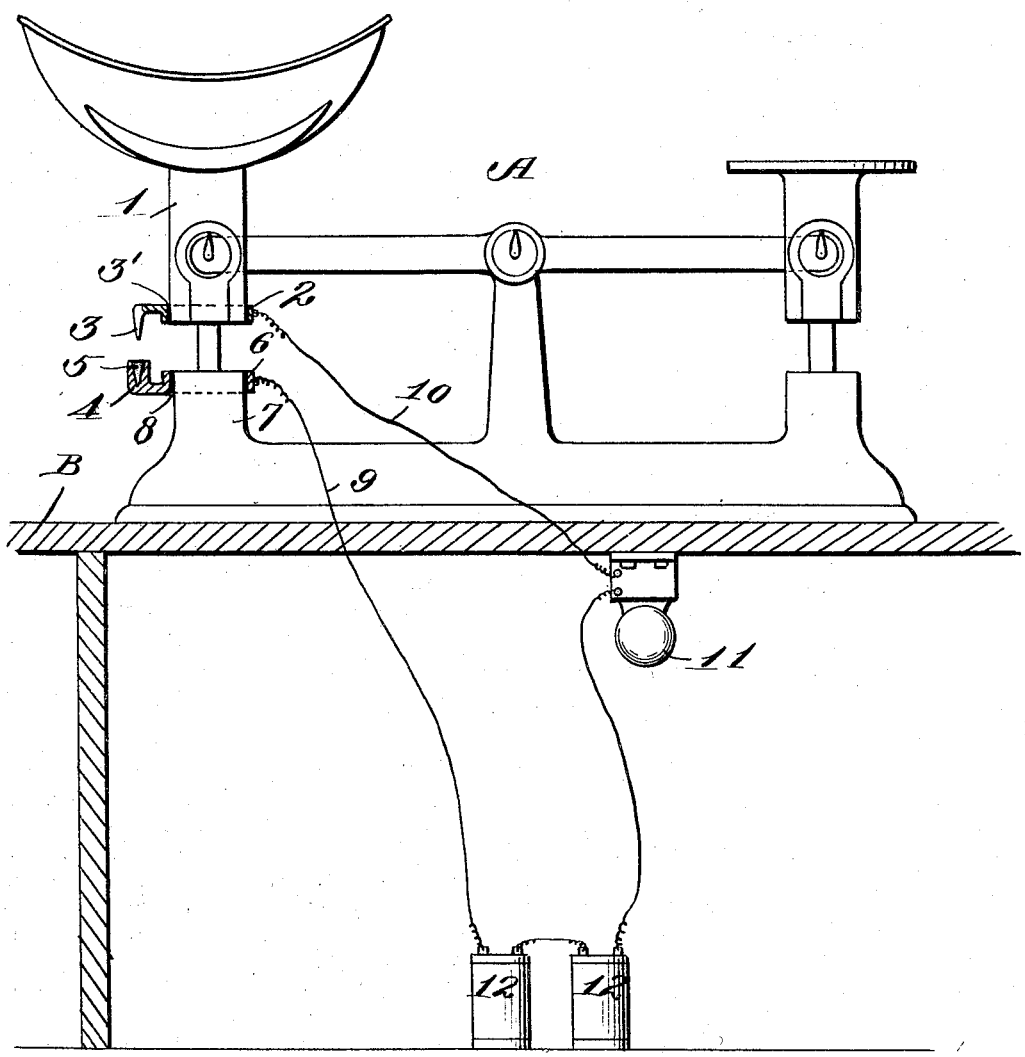

UNITED STATES PATENT OFFICE.

CLARENCE W. McKEE, OF EL PASO, TEXAS.

WEIGHING-SCALE.

SPECIFICATION forming part of Letters Patent No. 793,537, dated June 27, 1905.

Application filed November 2, 1903. Renewed May 20, 1905. Serial No. 261,424.

*To all whom it may concern:*

Be it known that I, CLARENCE W. McKEE, a citizen of the United States, residing at El Paso, in the county of El Paso and State of Texas, have invented new and useful Improvements in Weighing-Scales, of which the following is a specification.

This invention relates to weighing-scales.

The object of the invention is in a ready, simple, thoroughly-efficient, and practical manner to prevent overweighing, with consequent loss to the seller, and at the same time notify a purchaser that correct weight has been given; furthermore, positively to eliminate all friction between the operative parts of the attachment, thus to obviate any interference with the correct weighing operations of the scale.

With the above and other objects in view, as will appear as the nature of the invention is better understood, the same consists, generally stated, in a signaling device for weighing-scales embodying in its construction a contact movable with the pan-support and a make-and-break device supported by a fixed part of the scale comprising a cup or holder to contain a body of mercury to be engaged by the contact when the pan-support descends, the said contact and mercury-holder being in circuit with a source of electrical energy including a bell or other means for giving an audible signal.

The invention consists, further, in the novel construction and combination of parts of a signaling device for scales, as will be hereinafter fully described and claimed.

In the accompanying drawing, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in this drawing the figure is a view in side elevation, partly in section, exhibiting an ordinary balance-beam weighing-scale and connections between it and the signaling mechanism.

In the present instance the improvements are shown as combined with an ordinary balance-beam weighing-scale A, this for the purpose of convenience of illustration; but it is to be understood that the invention is not to be limited to this form of scale alone, as the improvements are equally adaptable to other forms and may be applied thereto without departing from the spirit of the invention. The scale is herein shown as resting upon a counter B merely to facilitate an understanding of the invention, it of course being understood that the device can be sold as an article of manufacture and attached to any ordinary scale. The signaling device is placed beneath the counter in order to prevent its being tampered with by unauthorized persons.

To the pan-support 1 of the scale, and at or near the lower end thereof, is secured a collar 2, between which and the said support is interposed suitable insulating material 3 in the nature of a gasket or ring. From one side of the collar 2 extends a downward-projecting contact-point 3, which may be of any suitable material, preferably of platinum on account of its non-destructive qualities, said contact being adapted to enter a cup or holder 4, containing a body of mercury 5, said cup being carried by or integral with a collar 6, secured to one of the scale-uprights 7 and insulated therefrom by suitable insulating material 8. The level of the mercury in the cup will be sufficiently removed from the upper end thereof to permit the contact to move a sufficient distance downward before engaging therewith to insure down weight; but in the event of overweight the contact will by remaining in the mercury cause a continuous sounding of the alarm or signal until the overweight has been removed. Each collar has connected with it a conductor 9 and 10, respectively, constituting a circuit in which is included an ordinary electric bell 11, the terminals of the circuit being connected with a suitable source of electrical energy, such as a plurality of dry cells 12, as clearly shown.

The device of this invention, while exceedingly simple in construction, will be found thoroughly efficient and durable for the purpose designed and will not be liable to damage or derangement in use; but in case it should be rendered inoperative from any cause repairs may readily and cheaply be effected.

Having thus described the invention, what I claim is—

The combination with a weighing-scale provided with a pan-support and with an upright, of a collar secured to and insulated from each of the said parts, the collar on the pan-support being provided with a contact-point and the collar on the scale-upright having a cup or holder to contain a body of mercury to be engaged by the contact-point, and a signaling device in electrical circuit with the two collars.

In testimony whereof I have hereunto set my hand in presence of two subscribing witnesses.

CLARENCE W. McKEE.

Witnesses:
GREENBERY BRIGHT,
C. E. McKEE.